July 1, 1930.    L. HARRISON    1,769,781
ANTIDAZZLE DEVICE FOR THE HEADLIGHTS OF MOTOR VEHICLES
Filed Sept. 21, 1927    2 Sheets-Sheet 1
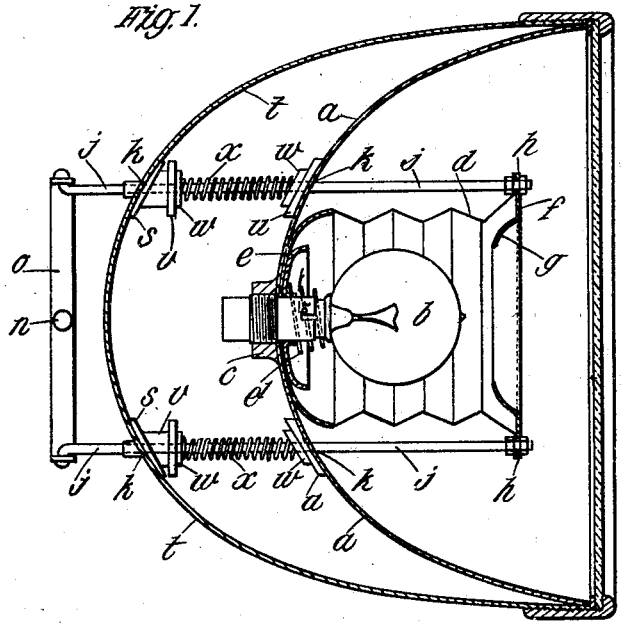
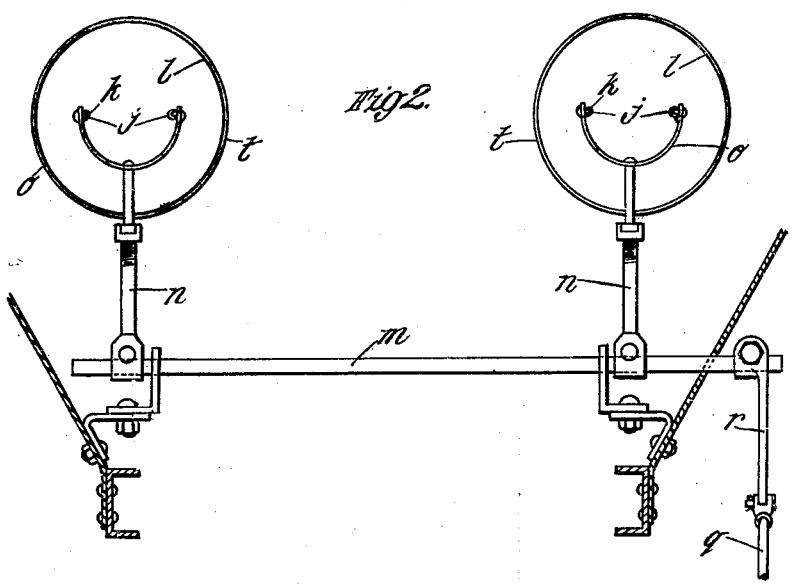

July 1, 1930. L. HARRISON 1,769,781
ANTIDAZZLE DEVICE FOR THE HEADLIGHTS OF MOTOR VEHICLES
Filed Sept. 21, 1927 2 Sheets-Sheet 2
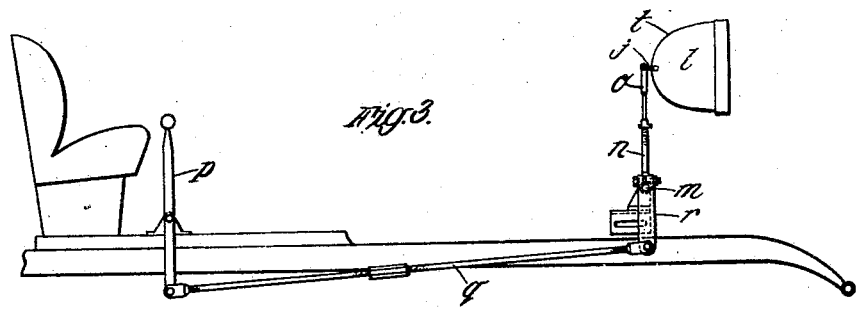
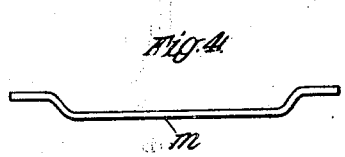
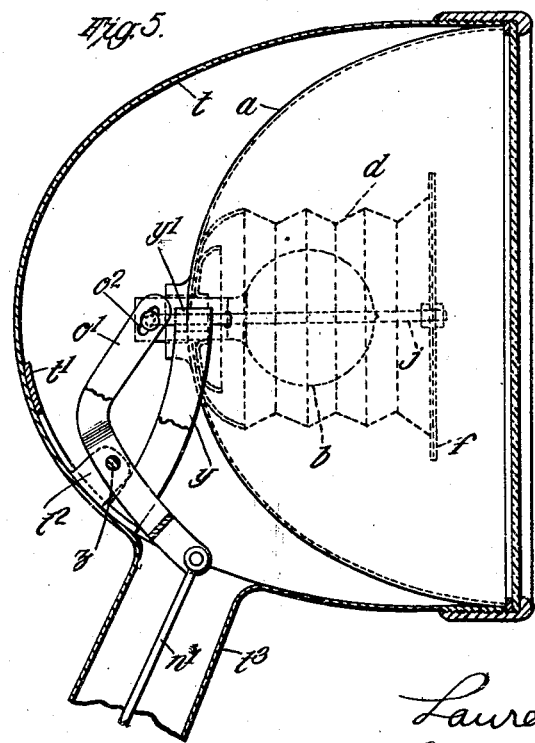

Patented July 1, 1930

1,769,781

UNITED STATES PATENT OFFICE

LAURENCE HARRISON, OF HAMPTON, ENGLAND

ANTIDAZZLE DEVICE FOR THE HEADLIGHTS OF MOTOR VEHICLES

Application filed September 21, 1927, Serial No 221,094, and in Great Britain September 21, 1926.

This invention relates to anti-dazzle devices for the headlights of motor vehicles, and more particularly to the type of anti-dazzle device comprising an expansible and contractible screen interposed between the source of illumination and the reflector of the lamp.

Hitherto such expansible and contractible screens have been constructed in the form of volute springs or again in the form of concentric rings actuated by a coil spring or simply a coil spring covered with a fabric such as silk.

According to this invention I provide an anti-dazzle device of the type described characterized in that the expansible and contractible screen is of fabric or other translucent material, and is adapted to be positively expanded and contracted without the use of a spring.

Means may be provided for supporting the fabric screen by one or more ring members.

In the preferred form the anti-dazzle device comprises a rear plate held in position by the bulb, or by a collar pressed on to the metallic part of the bulb, or the rear plate may (if necessary) be made to any thickness to form a distance piece and is pressed onto the metal part of the bulb and/or the lamp holder.

The screen is fixed to the rear plate either by an adhesive or by sewing, or any other suitable method. The front of the screen is fixed to the front plate or ring on which operate the positive means for contracting and expanding the screen. The front plate is preferably provided with lugs diametrically opposite one another, and adapted to receive the ends of a pair of rods passing through the reflector. These rods can be given an axial movement for the purpose of contracting and expanding the screen as hereafter set forth. The screen may be supported by one or more ring members surrounding the screen, and these ring members may also have lugs adapted to slide on the control rods, thus forming a guide on which the ring members can slide.

The invention further comprises means for operating anti-dazzle devices of the kind described, and operating means embodying the invention are characterized in that they comprise two or more rods passing through the lamp casing each having one of their ends connected to the screen, their opposite ends being connected to an arm or lever hand or foot operated from the driver's seat whereby the driver can impart a positive push and pull movement to said rods to operate the screen.

The invention further comprises packing means for preventing rain or fog and grit getting into the lamp casing by the holes where the rods pass through the lamp casing. Such moisture has resulted in damage to the finely polished surface af the reflector and also in the lamp glass being fogged or covered with a film of moisture.

According to this part of my invention packing means are provided at the points of entry of the rods through the lamp casing for the purpose of preventing water and dirt from entering.

I will now describe the invention with reference to the accompanying drawings, wherein:

Fig. 1 is a central vertical section of one form of anti-dazzle device made in accordance with the invention;

Fig. 2 is a sectional end elevation of the device showing the operating means;

Fig. 3 is a diagrammatic side elevation showing the anti-dazzle device and the operating means; and Fig. 4 is an elevation of a detail hereinafter referred to.

Fig. 5 is a vertical section of the anti-dazzle device showing an alternative form of operating mechanism.

The same reference letters are used throughout to designate the same parts.

In the drawings, $a$ represents the parabolic reflector of a headlamp, and $b$ is the bulb secured in the lamp holder $c$. An expansible and contractible screen $d$ of silk or other translucent material arranged in accordeon pleats or folds is disposed around the bulb $b$, the rear end being secured to a rear plate $e$ which is preferably not fixed to the reflector $a$ but is held in place by being slipped over the lamp holder and clamped by a locking ring, or, preferably, by a light spring $e'$. Another method of mixing the rear plate $e$ is to make the latter thicker in the centre so as to constitute a distance piece and slip it over the metal part of the bulb $b$ and/or the lamp holder $c$. The front end of the screen $d$ is secured to a front plate or ring $f$ which is preferably provided with a small flange $g$ to provide the necessary rigidity. The front plate $f$ is provided with lugs $h, h$ through which are passed the ends of a pair of control rods $j, j$, the latter passing through holes in the reflector $a$ and lamp casing $t$ as shown at $k$. By moving the control rods $j, j$ axially, the screen $d$ can be made to positively expand or contract. When it is fully contracted, the light from the bulb $b$ can shine directly onto the parabolic reflector $a$, but when it is fully expanded, all direct rays from the bulb $b$ are cut off, and only a diffused light passing through the translucent material can reach the reflector $a$. The screen $d$ may be supported by one or more intermediate ring members, to which the silk or other material may be secured by an adhesive, stitching, or otherwise suitably. The ring member is provided with lugs through which the control rods $j, j$ pass, thus forming a guide on which the ring can slide. This arrangement ensures the ring sliding with an axial movement, thus assisting to support the screen and fold it up without excessive puckering when moving into the contracted position.

With this arrangement I may dispense with the use of a spring within the lamp to expand the screen.

In the preferred form of the operating means, two headlamps $l, l$ are operated simultaneously by a horizontal cross-shaft $m$ situated adjacent the headlamps, the said shaft $m$ having an adjustable arm $n$ opposite each lamp $l$ to which the ends of the rods $j, j$ which pass through the lamp casing $t$, are attached. Rotation of the cross-shaft $m$ causes the two arms $n, n$ thereon to give an axial pull and push movement to the rods $j, j$ and operate the screen $d$ of the anti-dazzle device.

The rods $j, j$ which operate the screen $d$ are preferably, as already mentioned, attached to the lugs $h$ of the plate $f$ provided on the forward end of the screen $d$. At least two rods $j, j$ are necessary and these are fixed diametrically opposite to one another on the plate or ring $f$. The rear ends of the two rods $j, j$ are preferably pivoted to the forked ends $o, o$ of the arms $n, n$ carried by the said cross-shaft $m$. If the rods $j, j$ are thin, the foreshortening of the arm $n$ on the cross-shaft $m$, which necessarily takes place as it moves, is so little that the rods $j, j$ can bend to compensate for this.

The shaft $m$ is operated by a control lever $p$ at the driver's seat through the agency of an adjustable connecting rod $q$ and link $r$.

If desired, any number of operating rods $j, j$ may be employed in which case these are preferably spaced equally round the ring or plate on the front of the screen $d$.

If three rods are used they will be spaced at 120°, or if four rods are used they will be at 90° apart.

When more than two rods are used, it may be desirable to secure their rear ends to a ring or disc, not shown, so that all of the rods can be operated equally and together. A suitable connection is arranged between the cross-shaft arm and the ring or disc. In this case the pivotal point between the cross-shaft arm $n$ and the ring or disc may be adapted to slide to compensate for the foreshortening of the arm due to its movement.

Control mechanism in accordance with this invention has the advantage of positive action in both directions which cannot be satisfactorily obtained by the use of Bowden cable.

The control lever $p$ in the driver's seat may be adapted to rest only in two positions, namely, full on or full off; in this way the driver cannot inadvertently leave the dimmer half on.

The shaft $m$ may be cranked as shown in Fig. 4 to meet any desired service.

The packing means comprise a felt pad $s$ surrounding each of the said rods $j, j$ and applied within the lamp casing $t$, and also a felt pad $u$ surrounding the rod $j$ adjacent the hole $k$ where the rod $j$ passes through the reflector $a$. Suitably, a brass bush $v$ is applied around each rod $j$ adjacent the felt pad $s$ and a metal washer $w$ adjacent the bush $v$ and also adjacent the felt pad $u$. The two washers $w$ constitute abutments for a coil spring $x$ adapted to press the felt pads $s$ and $u$ against their respective abutments.

If desired, the bush $v$ and washers $w, w$ may be dispensed with, and the spring $x$ applied to bear directly upon the felt pads $s$ and $u$. These felt pads $s$ and $u$ are preferably soaked in oil in order to ensure the easy movement of the rods $j, j$. Any other suitable material may be used for this purpose instead of felt.

In another modification, I may provide packing glands at a point where the rods $j, j$ pass through the casing $t$. Where felt pads $s$ and $u$ are used pressed against the lamp casing by a coil spring $x$, it may be desirable to solder or otherwise secure members onto the inside of the lamp casing $t$ to ensure that the felt pads $s$ and $u$ shall be pressed against a surface at right angles to the rod $j$.

With a packing device made in accordance with this invention no water or dirt can enter the lamp and the withdrawing rods will be maintained continuously lubricated.

Fig. 5 shows an alternative form of headlamp which is supported on a hollow pillar $t^3$. In this form of construction the casing $t$ has secured thereon inside a plate $t^1$ with two bent up lugs $t^2$ carrying a pivot $z$ for a forked bell-crank lever $o^1$. The bell-crank lever has slots $o^2$ at each forked end and its stem pivoted to a push and pull member $n^1$. In the slots $o^2$ are pivoted the ends of the operating rods $j$ for extending and contracting the tubular screen. Bracket members $y$ extend from the plate $t^1$ and are provided with tubes $y^1$ on their ends to support the slide rods $j$. The push and pull member $n^1$ is pivoted to a lever secured on the cross-shaft $m$.

I claim:—

An anti-dazzle device comprising the combination of a headlamp casing having a hollow pillar, a reflector mounted in said casing, a lamp holder secured in said reflector, a lamp positioned in said lamp holder, a rear plate mounted on said lamp holder, an apertured front plate, a pair of operating rods supporting said front plate and horizontally extending through the holes in said reflector, a forked bell-crank lever having slotted fork ends pivotally connected to said operating rods and its stem connected to a push and pull member extending through said hollow pillar, and a translucent contractible screen having one end secured to said front plate and the other end to said rear plate.

In testimony whereof I have hereunto affixed my signature.

LAURENCE HARRISON.